United States Patent [19]

Herrington, Jr.

[11] 4,219,516
[45] Aug. 26, 1980

[54] METHOD FOR CONTROLLING FLOW OF MOLTEN POLYMER TO MULTIPLE EXTRUSION DIE ORIFICES

[75] Inventor: F. John Herrington, Jr., Holcomb, N.Y.

[73] Assignee: Mobil Oil Corporation, New York, N.Y.

[21] Appl. No.: 963,484

[22] Filed: Nov. 24, 1978

Related U.S. Application Data

[60] Division of Ser. No. 849,050, Nov. 7, 1977, Pat. No. 4,170,450, which is a continuation-in-part of Ser. No. 753,747, Dec. 23, 1976, Pat. No. 4,081,231.

[51] Int. Cl.$^2$ ............................................. B29F 3/06
[52] U.S. Cl. ............................. 264/40.7; 137/625.48; 264/176 R
[58] Field of Search ........................ 264/176 R, 40.7; 425/382 R, 464, 380; 137/625.48

[56] References Cited

U.S. PATENT DOCUMENTS

| | | | |
|---|---|---|---|
| 2,952,873 | 9/1960 | Porter | 425/380 |
| 3,046,602 | 7/1962 | Houvener | 425/464 |
| 3,054,143 | 9/1962 | Stenger | 425/464 |
| 3,355,763 | 12/1967 | Willert | 425/382 |
| 3,468,340 | 9/1969 | Camillo | 137/625.48 |
| 3,901,636 | 8/1975 | Zink et al. | 425/378 R |
| 4,076,477 | 2/1978 | Hacke | 425/464 |

Primary Examiner—Jeffery R. Thurlow
Attorney, Agent, or Firm—Charles A. Huggett; Ronald J. Cier

[57] ABSTRACT

In a thermoplastic extrusion system where a single extruder feeds molten polymer through a manifold to a plurality of separate extrusion orifices, a valve system is provided which distributes and regulates the flow of the molten polymer to the individual extrusion orifices.

2 Claims, 10 Drawing Figures

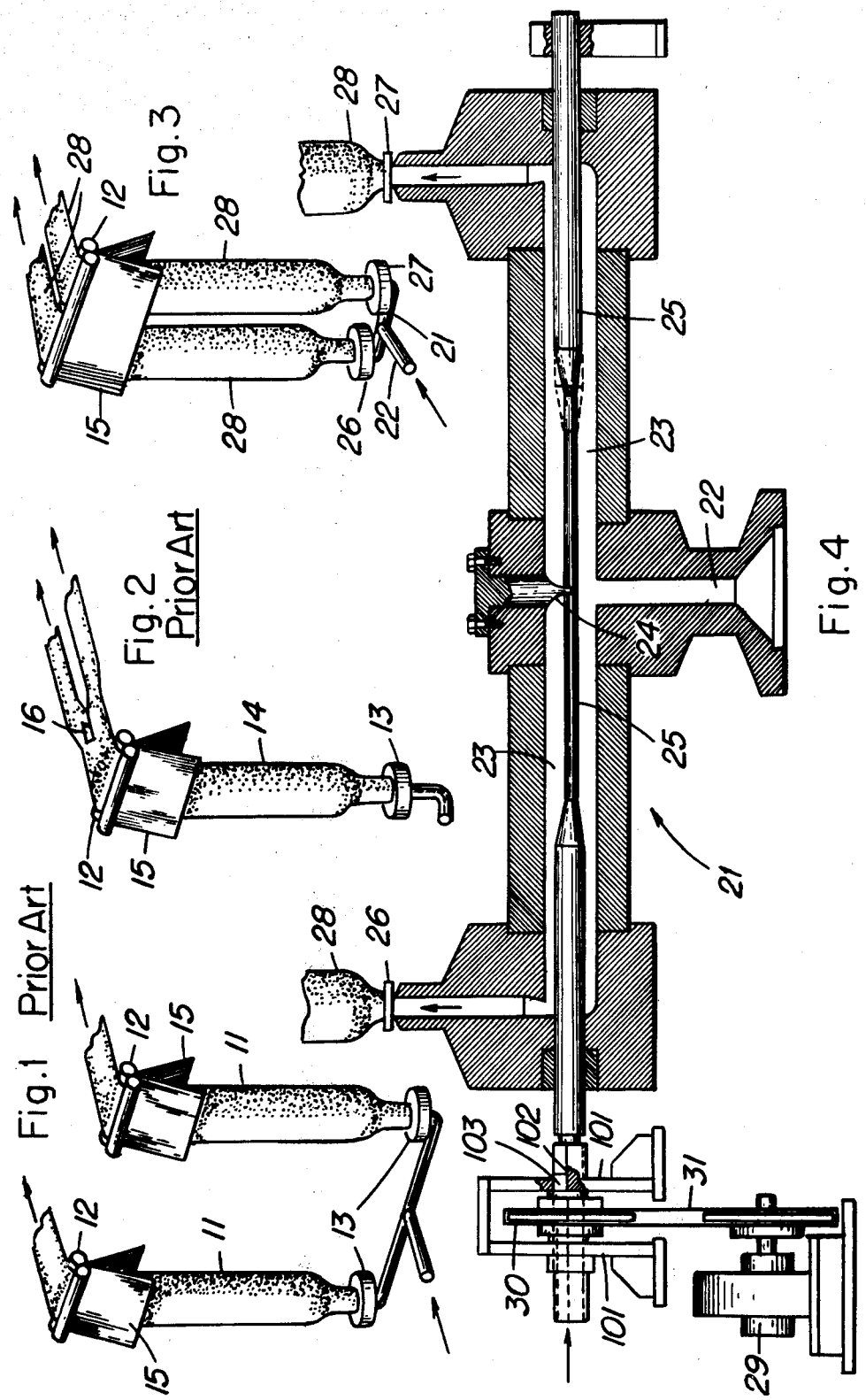

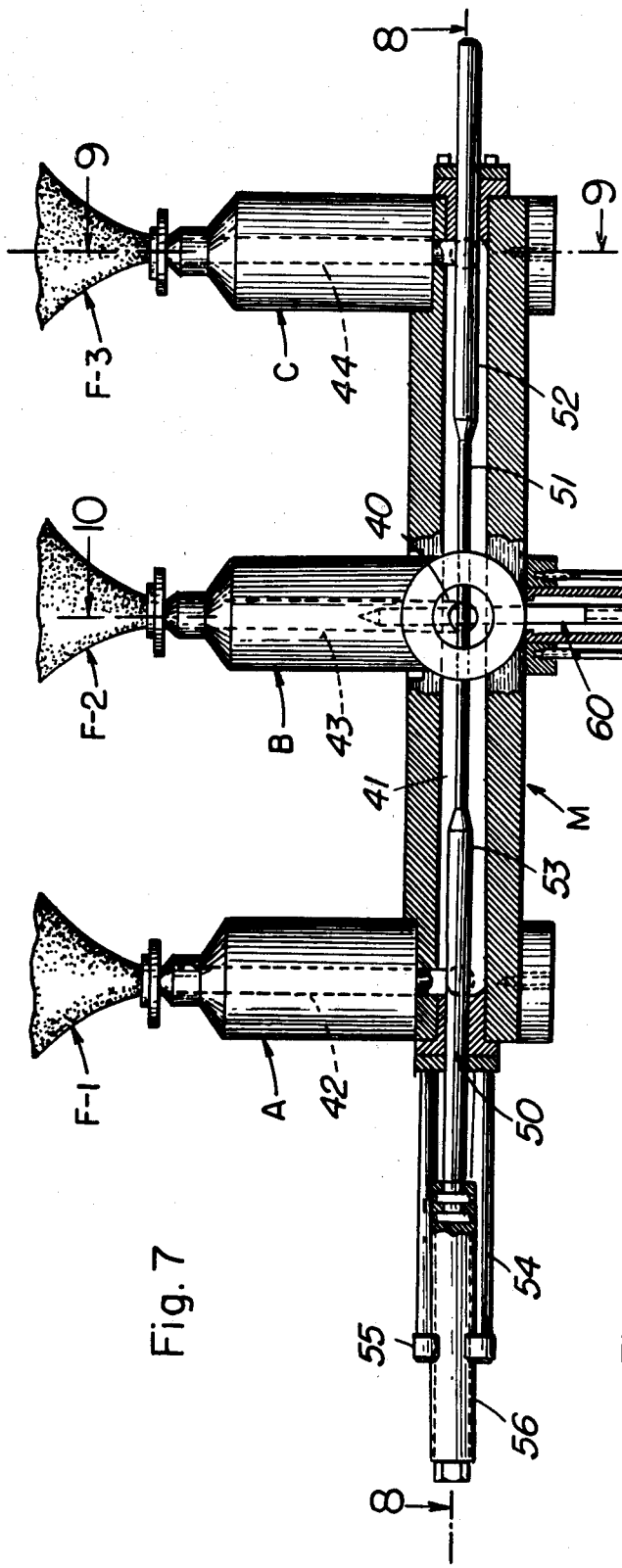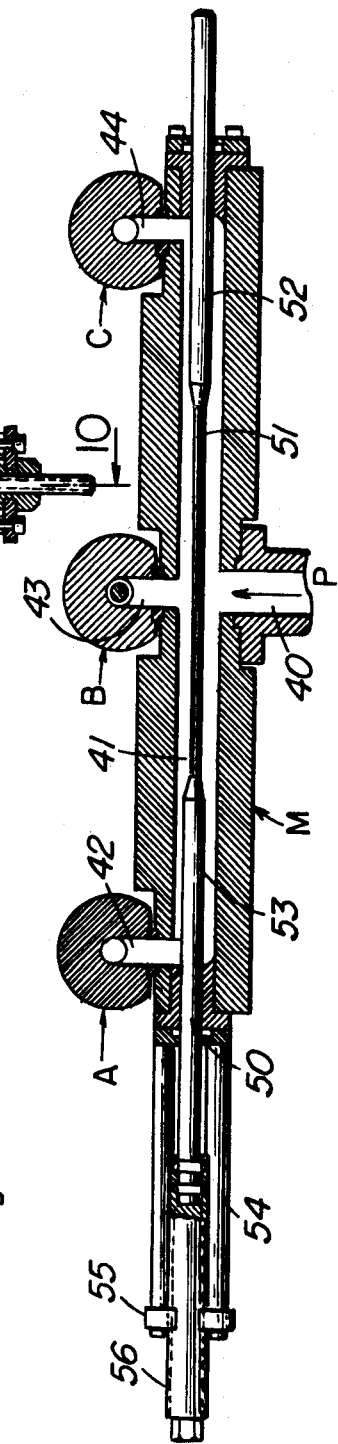
Fig. 7
Fig. 8

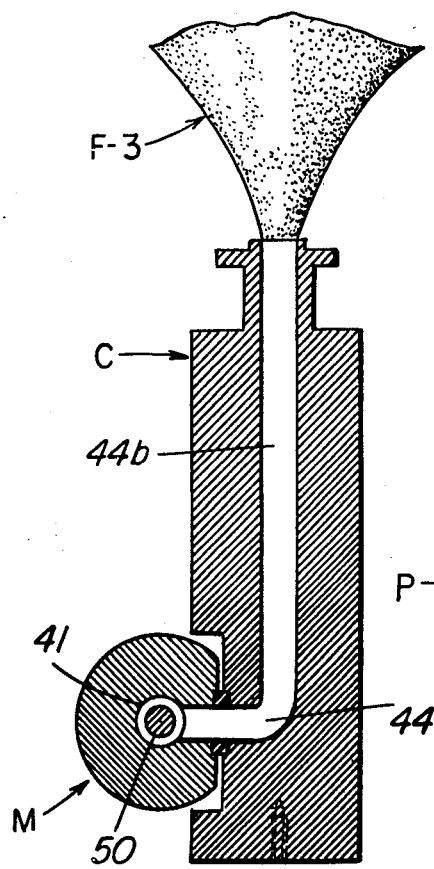
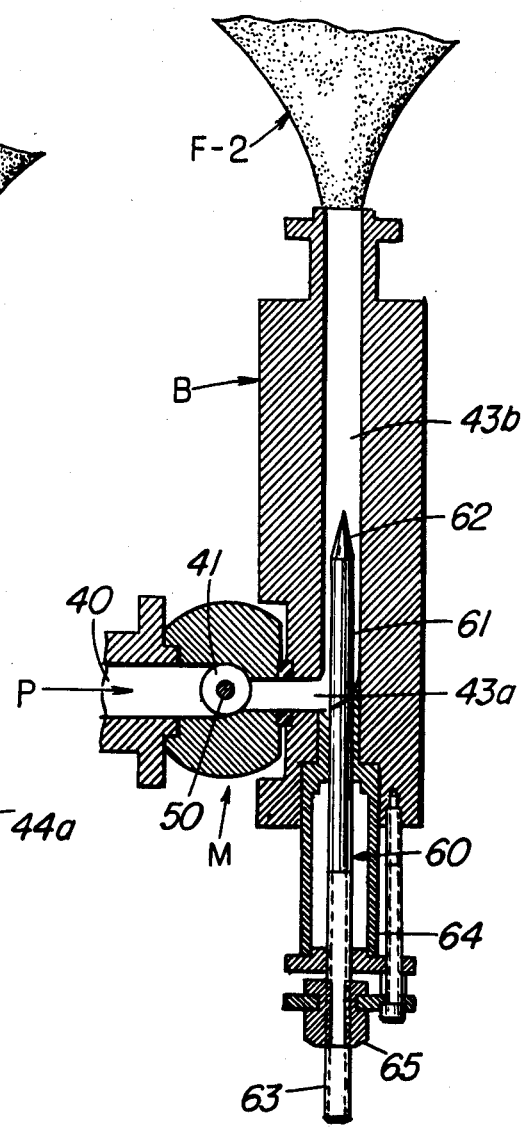
Fig. 9
Fig. 10

METHOD FOR CONTROLLING FLOW OF MOLTEN POLYMER TO MULTIPLE EXTRUSION DIE ORIFICES

CROSS-REFERENCE TO RELATED APPLICATION

This is a division of copending U.S. patent application Ser. No. 849,050, now U.S. Pat. No. 4,170,450 which is a continuation-in-part of application Ser. No. 753,747, now U.S. Pat. No. 4,081,231.

BACKGROUND OF THE INVENTION

1. Field of the Invention

In thermoplastic extrusion operations requiring the feed of molten polymer from a single extruder to a pair of extrusion outlet orifices or dies, care must be taken to insure that the distribution and pressure of the molten polymer exiting from each die is easily regulatable within precise limits to insure product quality and uniformity of the individually extruded films.

2. Description of the Prior Art

In the past, it has been common practice to feed dual tubular extrusion dies with a single extruder (not shown) as illustrated in FIG. 1. When it is desired to adjust the average film thickness 11 of the respective tubes, this may be accomplished by varying the rotational speed of the positively driven take-up nip rollers 12. An increase in nip-roller speed draws the still semi-molten polymer immediately adjacent the extrusion orifice away from the die 13 at a higher rate, resulting in a gauge reduction of the final tubular product. Such an arrangement for gauge control adjustment can be employed only when the tubes are being fed to separate, in-line, bag making machines due to the differential in the rate of travel between the flattened tubes.

FIG. 2 shows an alternate prior art technique of forming two tubes from a single extruder (not shown) by extruding a relatively large tube 14, passing the extruded tube through collapsing shields 15, nip rollers 12, and subsequently slit-sealing the tube utilizing a heated wire or blade 16. The forming technique has the advantage of permitting two tubular streams to be fed through one set of wide downstream equipment, such as printing presses and bag-making machines, but it has the drawback of introducing an additional heat seal seam in the finished bag product making such bags more susceptible to rupture under load stresses applied during use of the bag.

It would be possible to attain the quality advantage of the dual tube technique (FIG. 1) in which there is no side seal, along with the economic advantage of the slit-seal technique (FIG. 2) in which there is only a single set of downstream machinery, by extruding two tubes and running them through the same set of nip rolls. However, this does not permit operating the two tubes at different take-off speeds in order to adjust their relative average gauge. Such adjustment would require the employment of a separate flow-control valve for each die.

A typical flow control valve that is commonly used in prior art is shown in FIG. 6. Molten thermoplastic material 203 is caused to flow through gap 201, where it is subjected to a pressure drop. As the valve is adjusted by moving restricter 202, gap 201 is changed, and the resulting pressure drop is changed accordingly. If there are two such valves in parallel, fed from a common manifold source and discharging into identical downstream pressures, the flow rate through the two valves is proportional to approximately the 5th power of the size of the gap. Since this gap is usually a small fraction of an inch, it may be seen that a very small change in the size of this gap will result in an undesirably large change in flow rate. For example, if the gap is 0.1 inch, and it is changed by a very small amount such as 0.005 inches, there will be a resulting change in flow through that gap of approximately 28 percent, provided the supply and discharge pressures remain unchanged. Precise flow rate control with such valves is, at best, extremely difficult. It may be seen that prior art valving means such as that described above, when used in a pair (one for each die) cannot readily be used for the purpose of accurately balancing the flow, because they have the following limtations:

(a) They are not sufficiently precise to permit very accurate adjustment of flow distribution, for the reasons described above.

(b) Adjustment of one valve results in a change in net back pressure against the extruder, thus causing a change in total flow leaving the extruder. Therefore, any adjustment of a valve would necessitate re-adjustment of the extruder speed in order to restore the desired overall average thickness of the two streams.

(c) Since there is a separate valve for each die, the operator is required to make a decision as to which valve to adjust. After numerous adjustments, this sometimes results in both valves being almost fully closed, while at another time both may be almost fully open, so there is a difference in operating conditions (back pressure) for the extruder from one time to another.

SUMMARY OF THE INVENTION

One embodiment of the present invention is directed to a manifold valve which balances the flow of molten thermoplastic resin, such as polyethylene, between two dies which are being fed by the same extruder. The valve is located in a primary flow channel within the common manifold which feeds the two dies molten polymer. The molten polymer, introduced into the central portion of the manifold, is supplied from a single, conventional, rotating screw extruder. In one embodiment the valve comprises an elongated rod, or spool, which has a cross sectional area which is greater at the opposite ends of the rod than at its central portion. The rod, which is substantially symmetrical, has a thickness at its center which at a point spaced laterally from the center, gradually tapers to an increased thickness section, the increased thickness section remaining constant in cross section to the end of the rod. In another alternate embodiment of the valve structure of the present invention, the rod is constructed so that its central portion has a greater cross-sectional area than the opposite end portions of the rod. Means are provided to impart lateral displacement to the rod, such as a captive nut which rotates on threads at one end of the rod. Alternatively, a fixed nut and rotatable rod may be employed. Lateral displacement of the valve rod in turn causes lateral displacement of its section or sections of increased cross-sectional area, thereby alternately increasing and decreasing the volume of the opposing end-portions of the primary flow channel. Such displacement causes an increase in pressure drop (thus a decrease in flow) on the molten polymer flowing out one end of the manifold (i.e. the end-portion of decreased volume), while simultaneously causing a decrease in pressure drop (thus an increase in flow) on the molten polymer flowing out the opposite end of the manifold (i.e. the end-portion of increased volume). The resulting increase in flow at one end is equal to the decrease in flow at the opposite end, so that the total back pressure against the extruder remains substantially unchanged. The total flow rate leaving the extruder is unchanged, since that flow rate is dependent on the back pressure against the extruder. Obviously the internal cross-sectional area of the manifold flow channel must be greater than the cross-sectional area of the enlarged ends of the rod to insure a continuous flow path of the molten polymer and permit displacement of the rod within the primary flow channel. Lateral rod movement may be accomplished manually or by use of a gear motor attached to a chain drive wheel which may be mounted on the captive nut.

In an alternate embodiment the common manifold is adapted to supply molten polymer to three or more extrusion dies. Such adaptation is accomplished by means of one or more secondary extrusion dies connected to the manifold by way of secondary flow channels (one for each such secondary die) which intersect the primary flow channel intermediate to the aforedescribed end-mounted dies. Each of the secondary dies is provided with an independently controlled valve member comprising an elongated rod which is moveably mounted in the secondary flow channel to create a restriction of variable length therein. One end portion of the elongated rod, which is preferably tapered to minimize resistance to and turbulence in the flowing polymer stream, is inserted through the wall of the manifold and directly into the secondary flow channel between the primary flow channel and the extrusion die orifice, thereby forming an elongated restriction therein through which the molten polymer must pass prior to reaching the die orifice. In one embodiment the rod is inserted into a substantially horizontal section of the secondary flow channel with its tapered end portion directed into the flowing stream of molten resins. In another embodiment the rod is inserted upwardly, into an upwardly rising portion of the secondary flow channel, and its tapered end portion is directed toward the extrusion die orifice. As with the aforedescribed spool-like valve member, means are provided on the outside of the manifold to impart lateral displacement to the rod, such lateral displacement directly regulating the length of the restriction created by the rod. By increasing the length of this restricted portion of the secondary flow channel (and thereby decreasing the volume of the channel), one increases the pressure drop on the molten polymer flowing therethrough and hence decreases the rate of flow to the extrusion die. Likewise, by decreasing the length of the elongated restriction (i.e., increasing the volume of the channel) one decreases the pressure drop and hence increases the rate of polymer flow. By appropriate manipulation of the length of this restricted portion the extrusion rate of the molten polymer through the adjacent die orifice can be accurately balanced with that of the other die orifices on the same manifold.

In summary, the distribution valve apparatus of the present invention is employed for controlling the flow of molten thermoplastic polymer streams, such as polyethylene, in extrusion operations where it is desired to extrude at least two such streams from a single molten resin supply source. In one embodiment each of the molten polymer streams is fed to separate extrusion die orifices through a manifold which is fed molten polymer from the extruder. The manifold has a substantially centrally located inlet for introduction of the molten polymer, and comprises a primary flow channel which contains a flow restriction means, namely the spool-type valve rod hereinabove described. The valve rod is laterally displacable in the manifold flow channel. Lateral displacement of the valve results in an increase in pressure drop at one end of the manifold and an equal decrease in pressure drop at the opposite end of the manifold channel. In another embodiment additional extrusion die orifices are attached to the single common manifold by means of secondary flow channels connected thereto which intersect the primary flow channel intermediate to the two end-mounted dies. The molten polymer flowing to each additional die is regulated by means of a valve member adjacent to the die, such valve member comprising an elongated rod inserted into the secondary flow channel, thereby creating an elongated restriction of controllably variable length therein.

BRIEF DESCRIPTION OF THE DRAWINGS

FIGS. 1 and 2 are schematic illustrations of prior art tubular extrusion techniques.

FIG. 3 is a schematic illustration of a portion of an extrusion system which may be employed to form thermoplastic tubes utilizing the apparatus of the present invention.

FIG. 4 is a schematic illustration, in cross section, of an embodiment of the flow distribution valve apparatus of the present invention, mounted coaxially, and aligned within, the manifold flow channel.

FIG. 7 is a front elevation, in partial cross section, of an alternate embodiment of the present invention having three tubular extrusion dies mounted on the single common manifold.

FIG. 8 is a cross-sectional top view taken along line 8—8 of FIG. 7.

FIG. 9 is a side elevation of an end-mounted extrusion die taken along line 9—9 FIG. 7.

FIG. 10 is a side elevation of the intermediately mounted extrusion die taken along line 10—10 of FIG. 7.

DESCRIPTION OF SPECIFIC EMBODIMENTS

Figure 6:
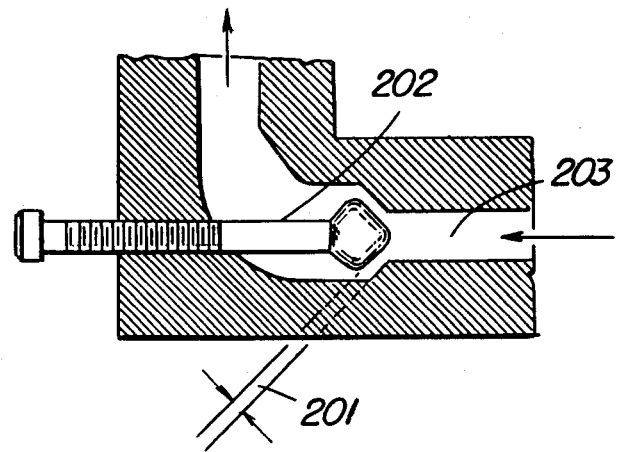
FIG. 6 is a typical flow control valve used in the prior art.

In the two extrusion die embodiment of the present invention, as shown in FIG. 4, molten thermoplastic resin is supplied to manifold 21 by a rotating screw type thermoplastic extruder (not shown). The molten thermoplastic resin is passed through manifold supply channel 22 under pressure from the extruder. Manifold supply channel 22 directs the thermoplastic to primary flow channel 23, shown here as being cylindrical in shape, where flow diverter 24 divides the entering stream to opposite ends of flow channel 23. Flow diverter 24 also acts as a support for flow distribution valve 25 to resist the pressure of the incoming polymer without distorting valve 25. It will be noted that flow distribution valve 25 comprises an elongated member which, in FIG. 4 embodiment, is substantially cylindrical and has a central portion of reduced diamter, while the opposite ends of valve 25 flare out to present cross sections having an increased diameter. The molten thermoplastic material passes through the annulus formed by the positioning of valve 25 in flow channel 23 and through tubular extrusion dies 26 and 27 mounted at opposite ends of manifold 21. The molten thermoplastic material is eventually expressed in the form of tubular film 28 through the annular extrusion orifices (not shown) of conventional tubular extrusion dies 26 and 27. It will be noted from FIG. 4 that one end of the distribution valve rod 25 extends through the end of the manifold, and is threaded. The threads on the spool are engaged by threads in a nut which is restrained from lateral movement by brackets 101. A keyway 102 in the threaded section of the spool, engaged by a key 103 fixed to bracket 101, prevents rotation of the spool while the nut may be rotated by driving motor 29 the drive chain 31 so that lateral motion may be imparted to valve rod 25 as required.

The pressure drop of the molten polymer within the manifold supply channel 22 will be dependent upon the size and length of the restriction through which it travels before being expressed into the extrusion dies 26 and 27 on opposite sides of the valve 25. The pressure drop per inch of molten polymer travel is greater in the region surrounding the larger diameter portion of the rod 25. Accordingly, it will be seen that if flow distribution valve rod 25 is shifted to the left, i.e., in the direction of tubular extrusion die 26, the length of that larger diameter portion to which the flowing thermoplastic material is exposed is reduced on the left end, and simultaneously increased on the right end, causing a reduction in pressure drop on the left end and a simultaneous increase in pressure drop on the right end. The flow rate through the left end then increases until the pressure drop is the same as it was before rod 25 was moved, and likewise the flow rate through the right end decreases until the original pressure drop is attained. After that has happened, the pressure in manifold supply channel 22 is the same as it had been previously, and the increase in flow rate at the left end has been equaled by the decrease in flow rate at the right end.

The above-described system has a particular advantage in ease of operation. Prior to adjusting the valve, the speed of the extruder and take-off equipment can be established such that the average product thickness through the two dies 26 and 27 is at the desired level. Then when the valve adjustment is made to produce an equal thickness from both dies, the average does not change. This is because the back pressure in channel 22 is not changed, therefore the pressure against which the extruder must pump its output is not changed, and accordingly the output rate from the extruder is not changed.

The above-described system has a further advantage in precision of adjustment. If there are two such valves in parallel, fed from a common manifold source and discharging into identical downstream pressures, the flow rate through the two valves is inversely proportional to approximately the cube (3rd power) of the length of the restriction. Since the initial length of that restriction is in the order of several inches, it is possible to make a substantial change in the length to achieve a fine adjustment in flow rate. For example, if the initial length of the restriction is 8 inches, and it is changed by a substantial amount, such as 0.25 inches, there will be a resulting change in flow through that gap of approximately 10 percent, provided the supply and discharge pressures remain unchanged. This permits much more precise adjustment than the variable-gap prior art valve in which a movement of 0.005 inch resulted in a 28 percent change in flow rate.

The above-described system has a further advantage in that there is a single control which may be used by the operator to re-distribute the flow. No decision is required on his part as to which knob to turn. Moving the spool to the left increases the average thickness of the product on the left and decreases the thickness on the right, and conversely.

Figure 5:
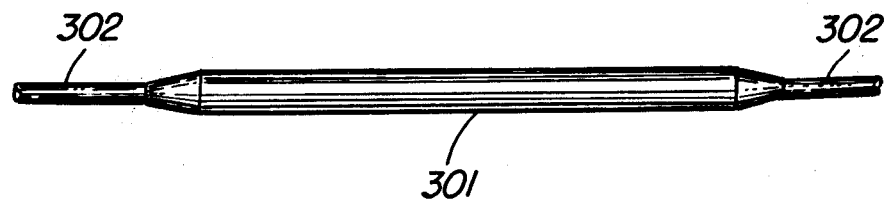
FIG. 5 is a fragmentary view of an alternate form of flow distribution valve in accordance with the present invention.

The valve embodiment shown in FIG. 5 has a centrally located enlarged cross section 301 while its end portions 302 are of reduced cross section. It will be apparent that lateral displacement of this rod causes a displacement of the enlarged portion 301 either right or left. Such displacement causes a variation in the length of the restriction in the end portions of the primary flow channel and results in a pressure drop variance as described above.

An alternate embodiment of the present invention is illustrated in FIGS. 7–10. Such embodiment is useful for the regulation and balancing of the extrusion rates of three or more molten polymer streams, each being expressed through a separate conventional extrusion die orifice mounted on a single common feed manifold. Shown in FIG. 7 is a manifold M adapted for supplying molten thermoplastic polymer (e.g., a polyolefin such as polyethylene) to three conventional dies (A, B & C) from a common feed source (not shown) for the extrusion of tubular films F-1, F-2 and F-3. Dies A and C are substantially identical and are mounted on opposite end portions of manifold M. Die B, which is mounted on manifold M intermediate to dies A and C, is substantially the same as dies A and C except that it is adapted to accommodate valve member 60, as will be more fully described hereinafter.

Looking for the moment at FIG. 8, it is shown that the molten polymer P enters manifold M through entry port 40 and flows into primary flow channel 41. Branching off from primary flow channel 41 are three secondary flow channels 42, 43 and 44 which serve as conduits for the polymer P to the dies A, B and C, respectively. The molten polymer is distributed between secondary channels 42, 43 and 44, flows upwardly through dies A, B and C and is extruded from the die orifices thereof in the form of tubular films F-1, F-2 and F-3, respectively (FIG. 7). The films are thereafter drawn away from the dies in the conventional manner and fed to the appropriate downstream processing sequences, the precise nature of which will be determined by the end-use of the film product and which are not shown.

As has been stated previously, it is highly desirable that the several films each be extruded at substantially the same rate and that each be of substantially the same thickness so that optimum utilization of the subsequent downstream equipment may be realized. These goals are simultaneously achieved by means of the manipulation of valve members 50 and 60 to controllably redistribute the flow of the molten polymer P through manifold M to each of the dies, A, B and C.

Valve member 50 comprises an elongated spool mounted in primary flow channel 41 and extending through the opposing end walls of manifold M. Spool 50 is centrally positioned along the long axis of primary flow channel 41 such that, in the embodiment illustrated, channel 41 acquires an annular configuration along its entire length. In the embodiment shown in FIGS. 7 and 8, spool 50 is substantially symmetrical in configuration, having a relatively small diameter at its central portion 51 which, at points spaced laterally from the center, gradually tapers to increased diameter sections 52 and 53. Sections 52 and 53 thereafter remain constant in cross-sectional area as they pass through the end walls of manifold M and extend beyond the manifold. Bracket 54 is attached to one end of manifold M and holds moveable nut 55 such that nut 55 is free to rotate but is restrained from significant lateral movement. Nut 55 in turn engages the threaded end portion 56 of spool 50. By rotating nut 55 spool 50 is displaced laterally, thereby repositioning the relatively narrow section 51 within flow channel 41 in relation to dies A and C.

The pressure drop of the molten polymer within primary flow channel 41 will be dependent upon the size and length of the restriction through which the polymer travels before being expressed into extrusion dies A and C on opposite sides of the valve spool 50. The pressure drop per inch of molten polymer travel is greater in the region surrounding the larger diameter portion of spool 50. Accordingly, it will be seen that if flow distribution spool 50 is shifted to the left, i.e., in the direction of tubular extrusion die A, the length of that larger diameter portion to which the flowing thermoplastic material is exposed is reduced on the left end, and simultaneously increased on the right end, causing a reduction in pressure drop on the left end, and a simultaneous increase in pressure drop on the right end. The flow rate through the left end then increases until the pressure drop is the same as it was before spool 50 was moved, and likewise the flow rate through the right end decreases until the original pressure drop is attained. After that has happened, the pressure in primary flow channel 41 is substantially the same as it has been previously and the increase in flow rate at the left end has been equalled by the decrease in flow rate at the right end.

Valve member 60, which may be viewed to advantage in FIG. 10, comprises an elongated rod 61 inserted through the wall of intermediate extrusion die B and/or manifold M and into the secondary flow channel 43. Rod 61 may be inserted into the upwardly rising section 43b of the secondary flow channel, as shown in FIG. 10, or it may be positioned in the horizontal section 43a thereof, in which latter embodiment the end portion of the rod will be directed into the flowing molten polymer P entering flow channel 43. The end portion 62 of the rod is preferably tapered to minimize turbulence in the flowing stream of molten polymer and, in the case of the alternate embodiment wherein the rod is directed into the flowing polymer, so that it will present a streamlined contour to the incoming polymer stream to minimize the resistance of the end of the rod to the movement of the molten fluid.

Rod 61 creates an elongated restriction in secondary flow channel 43 through which the molten polymer must pass before reaching the die orifice of extrusion die B. The rod 61 is held in fixed position relative to the walls of flow channel 43 but is capable of lateral movement therein, such that the elongated restriction it creates is of substantially constant and uniform cross section but is of variable length. Valve member 60 is adjustably attached to the body of the unit by means of a bracket and rotating nut arrangement (see 64 and 65) which engages threaded end portion 63 of rod 61 in the manner previously described with respect to bracket 54 and rotating nut 55.

A portion of the molten polymer stream P, after entering primary flow channel 41 of manifold M, flows into secondary flow channel 43 and is subsequently expressed from the orifice of extrusion die B as tubular film F-2. Prior to reaching the die orifice, the molten polymer stream passes through the elongated restriction caused by valve member 60, thereby increasing the pressure drop on the stream as it passes through channel 43 and reducing the flow rate. By varying the length of the restriction (and thereby simultaneously changing the volume of the flow channel) it is possible to regulate the pressure drop, and hence the flow rate, with a high degree of controllability. One is thereby able to adjust the extrusion rate of the polymer, which ultimately controls the thickness and extrusion rate of film F-2 and enables the operator to match film F-2 to the simultaneously extruded films F-1 and F-3.

The manner of balancing the extrusion rates and thicknesses of the three films is as follows. The extruder is turned on and allowed to equilibrate in the usual manner. After the films have begun being expressed, the extruder and downstream nip roller speeds are adjusted to give the desired average total product weight for the three webs F-1, F-2 and F-3. When this is satisfactory, the spool 50 is adjusted to achieve substantially identical product weight for the two outer dies A and C. The intermediate valve member 60 is then adjusted to make the product weight from intermediate die B the same as that from the two outer dies A and C. While it is conceivable that the total extruder output may change by a small amount when the flow rate to the intermediate die B is adjusted, any resulting change in back pressure on the extruder, and thus in extruder output, will be very small. This is because any reduction in flow through the center die which results from an adjustment of its valve member will generally be redistributed between the two outer dies, so that there will be an increase in output through each of the outer dies that is approximately equal to half of the reduction in flow through the center die. The back pressure through one of the outer dies is approximately proportional to the cube root of the flow, so the resulting change in back pressure on the extruder is very small. That is, the increase in back pressure on the extruder is about proportional to the cube root of the increase in flow through each of the outer dies, which in turn is equal to only half of the decrease in flow through the center die. As an approximate example, a 10% reduction in flow through the center die results in a 5% increase in flow through each outer die, which then results in about 1.6% (i.e. the cube root of 5%) increase in back pressure on the extruder. Consequently, readjustment of the extruder or nip speeds is, in usual practice, generally unnecessary.

The system described above has the advantage of precision of adjustment. Although the system has been described with reference to a manifold having three dies mounted thereon, it will be readily apparent that such a system may be easily expanded by providing a multiplicity of intermediate dies patterned after the aforedescribed intermediate die B.

In any of the aforementioned embodiments, the lateral displacement of the adjustable valve members may be initiated and controlled in the conventional manner (i.e. by a human operator who is monitoring the average film thickness somewhere downstream), or by means of automatic film thickness detection devices which are adapted to control the movement of the valves to compensate for any differential in the gauge of the various extruded films.

Although the present invention has been described with reference to the extrusion of tubular films of thermoplastic material, it has applicability to other extrusion techniques, such as the extrusion of flat films, filaments, solid tubes, foamed plastic sheets and tubes, extrusion coating, and so forth. Similarly, references in the specification and drawings to manifolds having a single feed source are intended to be merely illustrative of the concept disclosed herein, it being readily apparent to those skilled in the art that a single manifold can be designed to handle any number of such feed sources.

It is to be understood that other modifications and variations of the present invention may be made without departing from the spirit and scope of this disclosure, as those skilled in the art will readily understand. Such modifications and variations are to be considered as coming within the purview and scope of the appended claims.

I claim:

1. A method for controlling the flow of molten polymer from a common extrusion means to multiple extrusion die orifices, said method comprising:
   (a) feeding a stream of said molten polymer from said common extrusion means to a manifold by means of a first conduit connecting said manifold to said extrusion means;
   (b) dividing said stream into at least two separate molten streams and passing each separate stream through a flow channel, said flow channel having in it means for increasing or decreasing the volume of said channel, said means for increasing or decreasing the volume of said flow channels comprising an annular restriction of variable length in each of said channels, whereby the lengthening of said annular restriction will decrease the volume of said flow channel and thereby increase the restriction of the flow of said molten polymer through said channel while the shortening of said annular restriction will increase the volume of said flow channel and thereby decrease the restriction of the flow of said molten polymer through said channel;
   (c) extruding each of said separate streams through an extrusion die orifice positioned at the exit end of each of said flow channels; and
   (d) adjusting the flow rate of said molten polymer through each of said orifices by increasing or decreasing the volume of one or more of said flow channels.

2. A method in accordance with claim 1 wherein said feed stream is divided into two separate streams and each is extruded through a separate extrusion die orifice, the flow channels for conducting each of said separate streams from the common feed stream to its respective extrusion die orifice being connected together so as to form a single channel, the means for forming said annular restrictions of variable length in each of said flow channels comprising a single, laterally displaceable rod which extends through said single channel, said rod having at least one portion of its cross-section enlarged in diameter, whereby lateral displacement of said rod increases the length of said annular restriction in one of said two connected flow channels while simultaneously decreasing the length of said annular restriction in the other of said two connected flow channels by an equal amount.

* * * * *